Patented June 30, 1953

2,643,992

UNITED STATES PATENT OFFICE 2,643,992

FIBER-FORMING POLMERS

Earl W. Gluesenkamp and Alfred B. Craig, Dayton, Ohio, assignors, by mesne assignments, to The Chemstrand Corporation, a corporation of Delaware No Drawing. Application January 26, 1951, Serial No. 208,089

20 Claims. (Cl. 260—85.5)

This invention relates to polymeric compositions having unusual fiber-forming properties. More specifically the invention relates to polymeric acrylonitrile compositions capable of being converted readily into dyeable general purpose fibers.

It is well-known that polyacrylonitrile, and various copolymers of acrylonitrile and other olefinic monomers, can be spun into synthetic fibers having unusual physical properties. Because polyacrylonitrile and the many copolymers of acrylonitrile are almost inert chemically, conventional dyeing procedures are not useful in processing them. Many copolymers of acrylonitrile have been prepared using as the comonomers substances which have dye affinity. Copolymers of this type are not always satisfactory because of the excessive cost of the dye-receptive comonomers and because the introduction of such substances often depreciates the desirable fiber-forming characteristics of the polymer.

The primary purpose of this invention is to provide a new acrylonitrile polymer composition which has the chemical and physical properties of polyacrylonitrile, but which is also completely dye-receptive or can be made so by simple readily practicable procedures. A further purpose of this invention is to provide a means for converting non-dyeable acrylonitrile polymers into a dye-receptive form. A still further purpose is to provide new general purpose synthetic fibers.

In accordance with this invention it has been found that non-dyeable fiber-forming copolymers of over 80 per cent of acrylonitrile and fram two to 20 per cent of an unsaturated ester of an α-haloacetic acid may be rendered dye-receptive by reaction with tris(dimethylamido)-phosphite. The invention is also applicable to the treatment of any polymers of unsaturated esters of the α-haloacetic acids. Although the polymers of the unsaturated α-haloacetates containing less than 80 per cent of acrylonitrile are not usually fiber-forming, they are useful when blended in minor proportions with fiber-forming polymers of more than 80 per cent acrylonitrile. By this blending procedure the non-dyeable fiber-forming polymers are made capable of being converted into dye-receptive form, if the unsaturated haloacetate is present to the extent of two to 20 per cent of the total monomers present in polymeric form. In the latter modification the method of this invention is applicable to any polymers of the unsaturated haloacetates up to and including 100 per cent of the unsaturated haloacetates, whereby the polymer is treated with tris(dimethylamido)phosphite and then blended with the fiber-forming acrylonitrile resin. Alternatively the unsaturated haloacetate polymer may be first blended with fiber-forming acrylonitrile polymers and subsequently treated with tris(dimethylamido)-phosphite.

The unsaturated haloacetates which are suitable for the practice of this invention may be represented by the generic formula:

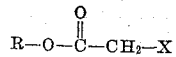

wherein R is an alkenyl radical selected from the group consisting of vinyl, allyl, methallyl and isopropenyl, and X is a halogen atom. Suitable monomeric substances include vinyl chloroacetate, allyl chloroacetate, methallyl chloroacetate, isopropenyl chloroacetate, and the corresponding bromine analogues.

The proportions of the unsaturated halogen-containing polymer will depend upon the degree of dye-receptivity desired, and upon the proportion of the chloroacetate in the blending polymer. In general it is desirable to have from two to 20 per cent of the fiber-forming composition in the polymeric form of the chloroacetate. Thus, if the blending polymer is 100 per cent chloroacetate polymer, from two to 20 per cent will be required to develop suitable dye-receptivity. If a copolymer of the chloroacetate and another monomer is used, proportionately more will be required to obtain the desired end result. Copolymers of more than 30 per cent of the haloacetate monomers and up to 70 per cent of another olefinic monomer may be used. These other monomers may be acrylonitrile, methacrylonitrile, vinyl acetate, vinyl chloride, vinylidene chloride, styrene, α-methylstyrene, and the various alkyl acrylates, alkyl methacrylates, alkyl fumarates and the alkyl maleates, wherein the alkyl radicals have up to four carbon atoms. Because copolymers of acrylonitrile have unusual solvent and chemical resistance the preferred blending polymer is one of substantial portions of acrylonitrile and sufficient of the chloroacetate monomer to develop dye-receptivity in the portions to be blended with the fiber-forming acrylonitrile polymers. A very useful blending polymer is one of 50 per cent of acrylonitrile and 50 per cent of the chloroacetate, for example, methallyl chloroacetate.

In the preparation of the fiber-forming polymers which are capable of being converted into dye-receptive form by the practice of this invention there are included the copolymers of 80 percent to 98 per cent of acrylonitrile and from two to 20 per cent of the unsaturated chloroacetate. If desired, minor proportions, for example, up to 18 per cent of one or more other monomers may be copolymerized with the critical components, for example, methacrylonitrile, styrene, vinyl acetate, α-methylstyrene, vinyl chloride, vinylidene chloride, the alkyl esters of maleic, fumaric, acrylic and methacrylic acids, wherein the alkyl group has up to four carbon atoms.

The polymers of the unsaturated esters of α-chloroacetic acid are preferably prepared in aqueous medium in the presence of a water-soluble peroxy catalyst and in the presence of an agent which maintains the polymer formed in a fine but granular dispersed condition. Suitable peroxy catalysts are the alkali metal persulfates and suitable dispersing agents are the alkali metal salts of sulfonated hydrocarbons. Polymerization may be conducted by batch procedures, by continuous procedures, or by combinations of these procedures. A preferred method of preparation involves a batch procedure wherein the desired monomers are mixed and charged gradually throughout the polymerization. Unusually uniform polymers may be obtained by also charging the catalyst and emulsifier continuously or in increments throughout the course of the reaction. More uniform polymerization conditions may be achieved by operating at uniform temperatures, for example, the reflux temperature of the medium, especially if the operation is so conducted as to provide a constant temperature at reflux.

If desired, the polymerization reaction may be conducted in the presence of a "redox" agent, for example, sulfur dioxide, sodium bisulfite, thiosulfate, or other sulfur compounds in which the sulfur is present in an oxidizable condition. Other optional procedures may involve the use of regulators which serve as chain terminators to prevent the formation of very high molecular weight increments, agents of this type being tertiary-dodecyl mercaptan, thioglycolic acid, and thioglycidol.

In order to convert the chloroacetate polymers or the fiber-forming blends containing increments of the chloroacetate polymers it is necessary to react the chloroacetate group with tris(dimethylamido)phosphite. This reaction serves to convert the chloroacetate into a phosphonium derivative which is reactive with acid dyestuffs. The polymers so treated are then capable of use in the fabrication of general purpose fibers.

The polymer may be treated with the tris(dimethylamido)phosphite by reaction with the polymer in the finely divided solid state, in solution in a suitable solvent or in the form of the finished fiber. If the polymer is in solid form, obviously only the surface will be reacted chemically, and if the polymer thus treated is subsequently dissolved and spun into fibers, the amount of effective component on the surface will be diluted when spun into fiber form. Accordingly, the preferred practice involves chemical treatment in solution state, where it is possible to approach stoichiometric reaction, or in the fiber form where saturation of chemical activity may be achieved on the surface.

It has been found that the most readily dyeable fibers are prepared by reaction with the tris(dimethylamido)phosphite dissolved in a suitable solvent, for example, N,N-dimethylformamide, butyrolactone, ethylene carbonate, and other conventional polyacrylonitrile solvents. In the practice of this invention the solutions of the polymers are mixed with tris(dimethylamido)phosphite by means of any conventional mechanical mixer, for example, Banbury mixer, roll mill or dough mixers. It is generally desirable to add sufficient tris(dimethylamido)phosphite to convert all of the chloroacetate nuclei to the phosphonium groups, although this does not necessarily have to occur. Obviously, if the extent of reaction is materially less than stoichiometric, it will be necessary to have a larger proportion of the chloroacetate nuclei present than is required generally for effective dye acceptance. In general if the reaction is sufficient to convert to phosphonium groups from two to ten per cent of the monomer present in the copolymers or blended copolymers a satisfactory result will be achieved, and if only from two to ten per cent of the monomer is in the form of unsaturated chloroacetate monomer a substantially complete reaction will be desirable.

The new blended compositions may be fabricated into synthetic fibers by conventional wet or dry spinning procedures. After stretching the fibers to develop the necessary orientation and the incident tensile strength, and thereafter shrinking the fibers to improve their thermal resistance, valuable general purpose fibers are obtained.

Further details of this invention are set forth with respect to the following examples:

*Example 1*

A copolymer of 95 per cent of acrylonitrile and five per cent of methallyl chloroacetate was dissolved to the extent of about 20 per cent in N,N-dimethylacetamide by intimately mixing the components at 80 to 85° C. for one hour. The solution was cooled to 60° C. and 15.4 grams of tris(dimethylamido)phosphite was added thereto. The solution was stirred for 30 minutes and then spun into fibers by extruding it through a spinneret having 30 apertures each 0.0035 in. in diameter. The fiber was stretched 150 per cent during washing, dried and thereafter stretched 381 per cent in a steam atmosphere.

A skein of a fiber was dyed in a bath containing 0.02 gram of Wool Fast Scarlet G. Supra dye, 0.1 gram of sulfuric acid, and 40 ml. of water for each gram of fiber. All of the dye was absorbed from the dyebath in 1 hour at 100° C. and the fiber assumed a vivid scarlet color.

A fiber made of the same copolymer without treatment with tris(dimethylamido)phosphite was dyed to a very pale pink color under the same conditions in an identical dyebath.

*Example 2*

A copolymer of 92 per cent of acrylonitrile and eight per cent of allyl chloroacetate was dissolved to the extent of ten per cent in dimethylacetamide. A stoichiometric equivalent (based on the allyl chloroacetate in the solution) of tris(dimethylamido)phosphite was added to the solution and thereafter heated for one hour at 60° C. An analysis of the polymer demonstrated that 80 per cent of the chlorine had been converted to ionic chlorine present in the phosphonium compound. Films were cast from the solution which were capable of exhausting the standard dyebath described in the preceding experiment.

Example 3

A copolymer of 60 per cent by weight of acrylonitrile and 40 per cent of methallyl chloroacetate was blended with a copolymer of 97 per cent acrylonitrile and 3 per cent vinyl acetate to form a 5 per cent methallyl chloroacetate blend. Sufficient N,N-dimethyl acetamide was added during the blending operation to form a solution of about 18 per cent solids. Fiber was spun in the manner described in Example 1.

A one gram sample of the fiber was treated with an excess of tris(dimethylamido)phosphite for 3 hours at 100° C. After washing the fiber was found to be unusually receptive of dye using the dyebath described in Example 1.

What is claimed is:

1. A method of preparing a dye-receptive polymer which comprises reacting tris(dimethylamido)phosphite and a polymer of a monomeric substance of which at least two percent by weight of the total monomer content is a compound of the structure:

$$R-O-\overset{O}{\underset{\|}{C}}-CH_2-X$$

wherein R is an alkenyl radical selected from the group consisting of vinyl, allyl, methallyl and isopropenyl and X is a halogen atom, and up to 98 percent of another polymerizable mono-olefinic monomer.

2. The method defined in claim 1 wherein the compound is an alkenyl chloroacetate.

3. A method of preparing a dye-receptive polymer which comprises reacting tris(dimethylamido)phosphite and a copolymer of 80 to 98 percent by weight of acrylonitrile and from two to 20 percent of a compound of the structure:

$$R-O-\overset{O}{\underset{\|}{C}}-CH_2-X$$

wherein R is an alkenyl radical selected from the group consisting of vinyl, allyl, methallyl and isopropenyl and X is a halogen atom.

4. The method defined in claim 3 wherein the compound is an alkenyl chloroacetate.

5. A method of preparing a dye-receptive polymer which comprises reacting tris(dimethylamido)phosphite with a blend of a polymer of a monomeric substance of which acrylonitrile is at least 80 percent of the total monomeric content and a blend of a polymer of a monomeric substance of which at least 20 percent is a compound of the structure:

$$R-O-\overset{O}{\underset{\|}{C}}-CH_2-X$$

wherein R is an alkenyl radical selected from the group consisting of vinyl, allyl, methallyl and isopropenyl, and X is a halogen atom, and up to 80 percent of another polymerizable mono-olefinic monomer.

6. The method as defined in claim 5 wherein the compound is an alkenyl chloroacetate.

7. A method of preparing a dye-receptive polymer which comprises reacting tris(dimethylamido)phosphite with a copolymer of polymerizable monomeric substances of which at least 20 percent of the total polymerizable monomers is a compound of the structure:

$$R-O-\overset{O}{\underset{\|}{C}}-CH_2-X$$

wherein R is an alkenyl radical selected from the group consisting of vinyl, allyl, methallyl and isopropenyl, and X is a halogen atom and up to 80 percent of another polymerizable mono-olefinic monomer, and thereafter blending the reacted polymer with a polymer of a polymerizable monomeric substance of which at least 80 percent of the total polymerizable monomer is acrylonitrile.

8. The method defined in claim 7 wherein the compound is an alkenyl chloroacetate.

9. A dye-receptive polymer which comprises a polymer of a polymerizable monomeric substance of which at least two percent of the total polymerizable monomer is a compound of the structure:

$$R-O-\overset{O}{\underset{\|}{C}}-CH_2-X$$

wherein R is an alkenyl radical selected from the group consisting of vinyl, allyl, methallyl and isopropenyl, and X is a halogen atom, and up to 98 percent of another polymerizable mono-olefinic monomer, said polymer having been reacted with tris (dimethylamido) phosphite.

10. The dye-receptive polymer defined in claim 9 wherein the compound is an alkenyl chloroacetate.

11. The dye-receptive polymer defined in claim 9 wherein the compound is vinyl chloroacetate.

12. The dye-receptive polymer defined in claim 9 wherein the compound is allyl chloroacetate.

13. The dye-receptive polymer defined in claim 9 wherein the compound is methallyl chloroacetate.

14. The dye-receptive polymer defined in claim 9 wherein the compound is isopropenyl chloroacetate.

15. A dye-receptive polymer which comprises a copolymer of 80 to 98 percent acrylonitrile and from 2 to 20 percent of a compound of the structure:

$$R-O-\overset{O}{\underset{\|}{C}}-CH_2-X$$

wherein R is an alkenyl radical selected from the group consisting of vinyl, allyl, methallyl and isopropenyl, and X is a halogen atom, said copolymer having been reacted with tris(dimethylamido) phosphite.

16. The dye-receptive polymer defined in claim 15 wherein the compound is an alkenyl chloroacetate.

17. The dye-receptive polymer defined in claim 15 wherein the compound is vinyl chloroacetate.

18. The dye-receptive polymer defined in claim 15 wherein the compound is allyl chloroacetate.

19. The dye-receptive polymer defined in claim 15 wherein the compound is methallyl chloroacetate.

20. The dye-receptive polymer defined in claim 15 wherein the compound is isopropenyl chloroacetate.

EARL W. GLUESENKAMP.
ALFRED B. CRAIG.

References Cited in the file of this patent

UNITED STATES PATENTS

| Number | Name | Date |
|---|---|---|
| 2,503,245 | Coover et al. | Apr. 1, 1950 |